United States Patent [19]
Kaufman et al.

[11] Patent Number: 5,081,678
[45] Date of Patent: Jan. 14, 1992

[54] METHOD FOR UTILIZING AN ENCRYPTED KEY AS A KEY IDENTIFIER IN A DATA PACKET IN A COMPUTER NETWORK

[75] Inventors: Charles W. Kaufman, Northborough; B. J. Herbison, Clinton, both of Mass.

[73] Assignee: Digital Equipment Corporation, Maynard, Mass.

[21] Appl. No.: 372,651

[22] Filed: Jun. 28, 1989

[51] Int. Cl.[5] .................... H04L 9/08; H04L 9/06
[52] U.S. Cl. ........................... 380/21; 380/25; 380/29; 380/49
[58] Field of Search ............ 380/21, 29, 49, 50, 380/24, 23, 25, 45

[56] References Cited

U.S. PATENT DOCUMENTS

| | | | |
|---|---|---|---|
| 4,227,253 | 10/1980 | Ehrsam et al. | 380/45 |
| 4,578,530 | 3/1986 | Zeidler | 380/24 |
| 4,578,531 | 3/1986 | Everhart et al. | 380/21 |
| 4,613,901 | 9/1986 | Gilhousen et al. | 358/122 |
| 4,731,840 | 3/1988 | Mniszewski et al. | 380/21 |
| 4,736,422 | 4/1988 | Mason | 380/20 |
| 4,771,458 | 9/1988 | Citta et al. | 380/20 |
| 4,771,459 | 9/1988 | Jansen | 380/21 |
| 4,805,216 | 7/1989 | Gruenberg | 380/21 |
| 4,887,296 | 12/1989 | Horne | 380/21 |
| 4,888,800 | 12/1989 | Marshall et al. | 380/21 |

*Primary Examiner*—Bernarr E. Gregory
*Attorney, Agent, or Firm*—Kenyon & Kenyon

[57] ABSTRACT

The nodes in a computer network utilize an encrypted key as a key identifier in a data packets transferred between nodes which eliminates the need for a receiving node to perform a memory look up operation to ascertain the key used to encrypt the data. Each node is provided with a master key that is unique to each node. When two nodes want to establish communications they first negotiate a shared key. This shared key is then encrypted under each nodes' master key. The nodes then exchange their respective encrypted key. The encrypted key of the receiving node is placed in the data packet to be sent by the transmitting node. Upon receiving a data packet, the receiving node decrypts the encrypted key to determine the shared key. This shared key is then used to decrypt encrypted data in the data packet.

22 Claims, 4 Drawing Sheets

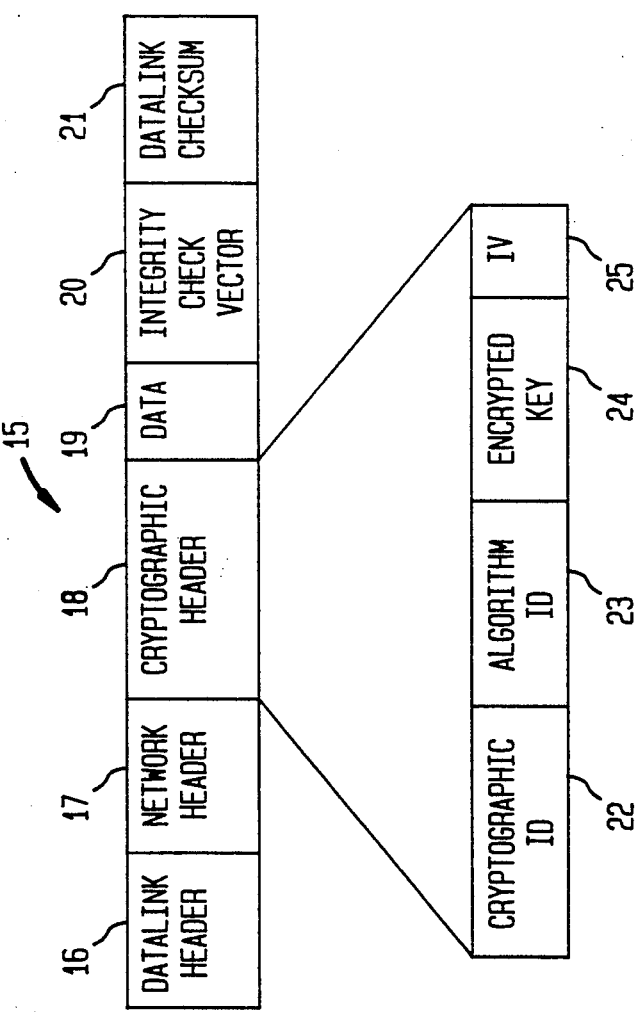
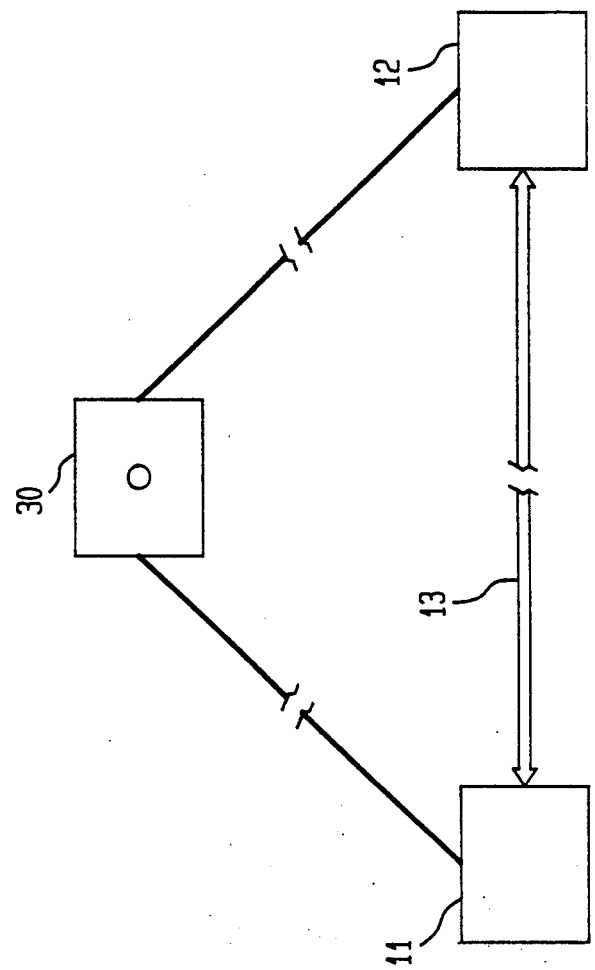

METHOD FOR UTILIZING AN ENCRYPTED KEY AS A KEY IDENTIFIER IN A DATA PACKET IN A COMPUTER NETWORK

FIELD OF THE INVENTION

This invention relates to computer networks and, more particularly, to a system which provides for the encryption and decryption of data transmitted in a computer network.

BACKGROUND OF THE INVENTION

A computer network consists of a plurality of nodes which are coupled together in some fashion, for example, in a ring, daisy-chained, or clustered network. Such computer networks may involve a small number of users located geographically close to each other or thousands of users located on different continents. A node is any device attached to a network which acts as an originator or recipient of data. Examples of such devices which could be nodes are computers, computer terminals and storage devices.

The ultimate goal of computer networks is to accurately transfer information between the nodes comprising the network. Some network applications require the maintenance of security measures to insure either, or both, the confidentiality or integrity of the information transferred between nodes. Typically, such confidentiality is implemented by cryptographically protecting data transferred between nodes using devices implementing a cryptographic algorithm in conjunction with a cryptographic key. As used in this specification, cryptographic processing includes encryption, decryption, and/or checking the integrity of a data packet. The cryptographic key is a parameter which controls both encryption and decryption operations.

Encryption can be used to provide either, or both, confidentiality or integrity for a data transfer operation. Integrity as used in this specification means insuring that the data received at one node is an accurate representation of the data transmitted from another node. The process of encryption for confidentiality is accomplished by an algorithm with a given key which will scramble data such that only a user who has that same key will be able to descramble the data. In order to ensure the integrity of the data, a similar algorithm is used which uses the data to obtain an integrity check vector which is transmitted along with the original, non-encrypted data and used to verify the data.

A node is coupled to a computer network by an adaptor which is an input/output device which receives data from or transmits data across the network under its own power without the need for intervention by a central processing unit ("CPU"). The adaptor may also perform the cryptographic operations. The adaptor can be a microprocessor-based or a hard-wired logic system. The adaptor monitors the network so that it can properly send or receive data. After receiving or sending data, the adaptor will interrupt the CPU to inform it that such transfer has occurred.

A node may be simultaneously maintaining multiple connections to many remote nodes. Such nodes communicate by exchanging data packets which typically consist of header information and data. Thus, in a network system for example where encryption is occurring, these data packets contain encrypted data and will arrive at the node from other various nodes in an interleaved manner and in an unpredictable order. The header information sets forth which node is the receiving node of the data packet, but each remote node and possibly each connection will have its data encrypted with a different key. Each data packet contains sufficient information for the receiving node to ascertain which key to use to decrypt and/or check the integrity of a data packet. This information may either be implicit, i.e., based upon the source address information, or explicit, i.e., based upon a key identifier placed in the packet. In the prior art, the header is not encrypted so that the data packet can be relayed by intermediaries along the network that do not have the key. Also, the key is not placed in the data packet header since this would allow any user of the network to intercept the data packet and, using the key, decrypt the data. For security purposes, the key must be known only to the nodes communicating with each other.

As a result of these requirements, there is a unique shared key for each communicating pair of nodes in the network and possibly for each connection existing between the communicating pair. In the case where the node's adapter performs the cryptographic functions, each node's adaptor must store all the keys it is currently using in a key table maintained in the node's adaptor memory. When an adaptor receives a data packet it can decrypt and/or check the integrity of the packet using the appropriate key for the transmitting node. The required size of the key table memory is proportional to the maximum number of different keys that will be simultaneously active. Thus, for large networks each node's adaptor potentially would have to maintain a very large key table in its memory. This results in a large amount of board space on the adaptor being dedicated to key table memory. To overcome this problem, some known techniques for reducing the size of the key table include encrypting multiple connections under a single key (especially when there are several connections to a single end node), limiting the maximum number of "active" connections, and treating the key table as a key cache and resorting to a less efficient means for cryptographic processing of packets whose keys are not in the cache.

Also, the receiving node in performing the look up operation in its key table does this to find the sending node's key so that it can use that key to decrypt or check the integrity of the data. This look up operation must be performed very quickly so that the cryptographic processing can be done as the data packet arrives. A common method used to facilitate the look up operation is to have the two nodes exchange an index in the data packet. This index serves as an index into the receiving node's look up table. The index enables the receiving node to locate the sending node's key, thus, enabling the receiving node to decrypt and/or check the received data.

While the prior art provides an adequate method of ascertaining the key of a sending node in order to decrypt a data packet, there is a need for advancement. In particular, there is a need to minimize the amount of required key storage memory in a node while maintaining the security of communications between nodes in a computer network.

SUMMARY OF THE INVENTION

The present invention enables a node in a computer network to either decrypt and/or check the integrity of a received data packet without performing a look up operation in a key table to ascertain the key of a sending node. Thus, the need for key table memory in the adaptor is eliminated. The present invention determines the cryptographic key by a decryption operation instead of a memory look up.

Before two nodes in a computer network can communicate securely, they must agree on a key referred to as a shared key, that will be used to encrypt, decrypt and/or check the integrity of the data transmitted between these nodes. The negotiation of the shared key can either be static, i.e., selected once and remain fixed, or dynamic, i.e., negotiated each time the nodes wants to communicate.

Each node in the network also has a master key that is unique to that node. The master key is used according to the present invention, to encrypt the shared key under the master key of each of the two nodes. This provides each node with an encrypted version of the shared key which is then used as a key identifier in each data packet transmitted between the nodes.

For example, in the course of a session establishment, each node tells the other what its encrypted version of the shared key is and to use this in any data packets communicated between them. Each time two nodes communicate, the sending node places the receiving node's encrypted version of the shared key in the data packet transmitted. The receiving node, upon receiving the data packet will decrypt the transmitted encrypted version of the shared key under its master key and thus obtain the shared key which the receiving node utilizes to process the remainder of the data packet. The receiving node thus needs only storage space for a single key—the master key for this node. Thus, the present invention substitutes a decryption operation for a memory look up.

The present invention also provides for the integrity of communication between two nodes. If the data in the data packet is encrypted, then a simple error detection scheme is implemented to insure that the received data accurately represents the transmitted data. If, however, the data is not encrypted, the present invention provides an integrity check vector in each data packet. The integrity check vector is calculated pursuant to an encryption algorithm as a function of the data and the shared key. Upon receiving a data packet, the receiving node calculates its own integrity check vector based upon the received data and decrypted shared key. A comparison of the calculated integrity vector and received integrity check vector is performed to insure accurate communications.

Accordingly, the present invention provides two levels of decryption to be performed on a data packet by a receiving node or one level of decryption and one level of integrity checking. In order to do this, the receiving node need only decrypt the encrypted key under its master key to ascertain the shared key. Once the shared key is determined, it is then used to either decrypt the remainder of the data packet as it is received or verify the integrity of the received data packet. Thus, the need for key table memory resident on the adaptor is eliminated.

BRIEF DESCRIPTION OF THE DRAWINGS

FIG. 3 illustrates a data packet transmitted by a node in a computer network.

FIG. 4 is a block diagram of a preferred embodiment of a computer network.

DETAILED DESCRIPTION

Figure 1:
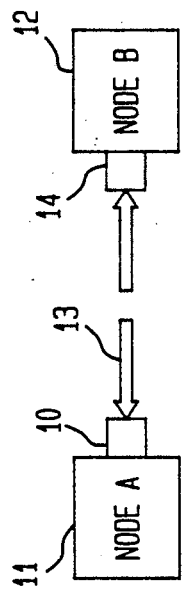
FIG. 1 is a block diagram of a portion of a computer network.

Referring now to the drawings and initially to FIG. 1, there is illustrated, in block diagram form, a simplified system configuration according to the invention. The system comprises a node A 11 and a node B 12. The nodes are coupled to a bus 13 by their respective adaptors 10 and 14. Serial data packets are transmitted between node A 11 to node B 12 across the bus 13.

Figure 2:
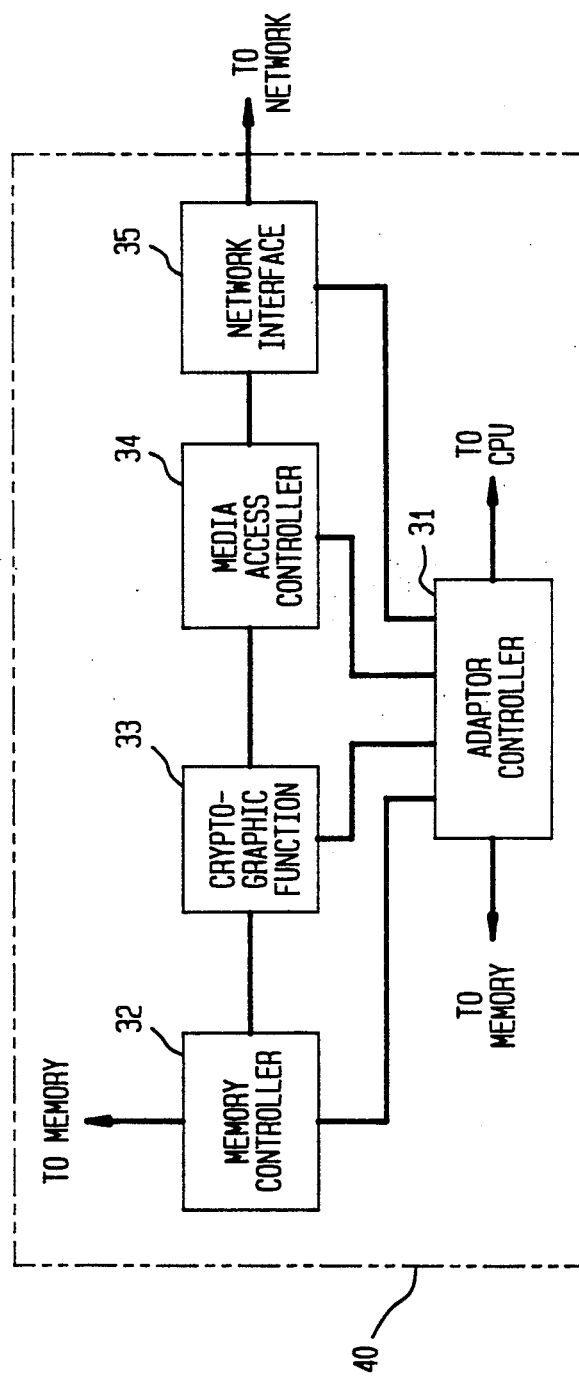
FIG. 2 is a block diagram of an adaptor.

Referring now to FIG. 2, there is illustrated, in block diagram form, an exemplary embodiment of an adaptor 40. The adaptor 40 comprises an adaptor controller 31, a memory controller 32, a cryptographic function 33, a media access controller 34 and a network interface 35. The network interface 35 provides a physical connection to the network. The media access controller 34 monitors the network for incoming messages and determines when outbound messages can be sent. The cryptographic function 33 encrypts and/or computes an integrity check vector for outgoing data packets or decrypts and/or checks the integrity of incoming data packets without the key table memory of prior art adaptors. The memory controller 32 is responsible for maintaining pointers to node memory where data packets are stored. The adaptor controller 31 off loads functions from the node's CPU and enhances adaptor's 40 independence.

Figure 2A:
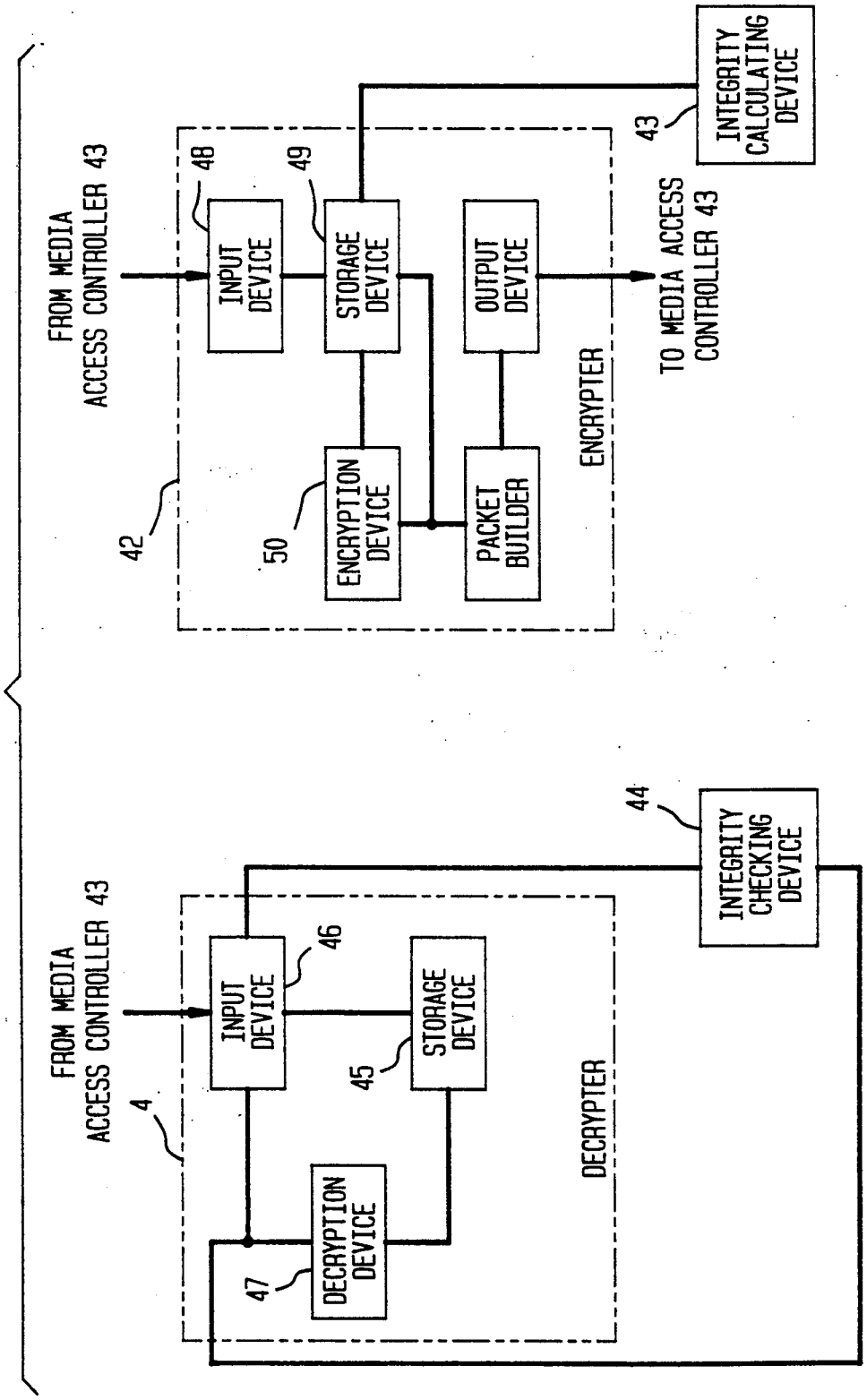
FIG. 2A is a block diagram of the cryptographic function 33.

Referring now to FIG. 2A, there is illustrated, in block diagram form, an exemplary embodiment of the cryptographic function 33. The cryptographic function 33 comprises an encrypter 41, a decrypter 42, an integrity calculating device 43 and an integrity checking device 44. The integrity calculating device 43 is coupled to the encrypter 41 and the integrity checking device 44 is coupled to the decrypter 42. The decrypter 42 includes a storage device 45, an input device 46 and a decryption device 47 which performs the actual decryption. The storage device 45 is coupled to the input device 46 and the decryption device 47 is coupled to the input device 46 and the storage device 45. The integrity checking device 44 is specifically coupled to the input device 46 and the decryption device 47. The encrypter 41 includes an input device 48, a storage device 49, a device 50 to perform the actual encryption, a packet builder 51 and an output device 52. The input device 48 is coupled to the storage device 49. The device 50 that performs the actual encryption is coupled to the storage device 49. The packet builder 51 is coupled to the device 50 that performs the actual encryption and the storage device 49. The output device 52 is coupled to the packet builder 51. The integrity calculating device 43 is specifically coupled to the storage device 49.

Referring now to FIG. 3, there is illustrated a data packet 15 which is transmitted between node A 11 and node B 12. The data packet 15 comprises a datalink header 16, a network header 17, a cryptographic header 18, data 19, an integrity check vector ("ICV") 20 and a datalink checksum 21. The datalink header 16 comprises approximately fifteen bytes. The information stored in the datalink header 16 depends upon the network configuration in which the data packet is being transmitted, e.g., Ethernet, T1, etc. The network header 17, comprising approximately sixty bytes, contains information in a format recognized on any network through international standards. The network header 17 contains all the information necessary to get a data packet from a sending node, through a network, to a receiving node. The data 19 contains the data being transmitted. This field may be encrypted for confidentiality. The number of bytes comprising the data depends upon the minimum number of bytes required for the data transfer, e.g., eight bytes, and the number of data bytes which the link can support, e.g., five hundred to four thousand bytes.

The cryptographic header 18 comprises a cryptographic ID field 22, an algorithm identifier 23, a key identifier 24, and an IV field 25. The cryptographic ID field 22 comprises one or two bytes and indicates that the following collection of bytes comprises the cryptographic header 18. The algorithm identifier 23 comprises one byte which indicates which of a number of standard cryptographic functions should be used to decrypt and/or check the integrity of this data packet and whether integrity and/or confidentiality is provided. A standard for cryptographic functions is the Data Encryption Standard (hereinafter "DES") passed by the National Board of Standards in January, 1977. DES sets forth a data encryption algorithm for a 64-bit (eight byte) data block using a 64-bit (eight byte) key. This algorithm is described below.

The two nodes involved in a communication must agree upon the interpretation of the algorithm identifier 23 for it to have any meaning. Most network implementations support only one algorithm, therefore, the algorithm identifier 23 is superfluous. However, the identifier is included in the cryptographic header 18 to avoid future expansion problems because it may be used in the future. For unauthorized user to intercept or modify a message in a network, he must know both the encryption algorithm and the key being used. Since the algorithm identifier 23 does not conform to some international standard, it alone does not divulge the algorithm in use. In any event, a basic philosophy of cryptography is that the security which is provided by the algorithms should not depend upon the secrecy of the algorithm itself.

The key identifier 24, which is typically one or two bytes long, is eight bytes long in the present invention. The IV field 25 which is eight bytes long, deals with the manner that cryptograhic functions work and guarantees that the same message is never sent twice.

The ICV 20, which is four or eight bytes depending upon whether the data is encrypted, provides modification detection for the data 19. The ICV 20 is used to detect transmission errors as well as prevent unauthorized users from modifying the data 19 without notice to the receiving node.

There are a multitude of methods for calculating the ICV 20. If the data 19 is encrypted, then, for example, a cyclic redundancy check as the ICV 20 is sufficient to provide data integrity. If the data 19 is not encrypted, however, then a cyclic redundancy check for the ICV 20 would be inadequate because potential modifications to the data 19 could be disguised by making corresponding modifications to the ICV 20. Thus, when the data 19 is not encrypted it is necessary to calculate the ICV 20 based upon an encryption algorithm such as the DES algorithm explained below.

The datalink checksum 21 comprises approximately four bytes and provides error detection for random transmission errors for the entire data packet 15.

Prior to establishing a secure communications link, node A 11 and node B 12 (FIG. 1) must agree on a shared key that they will use in cryptographic processing. To do this, there are several methods of negotiating a shared key. For example, a manual method where a user at node A 11 will select a key, write it down on a piece of paper and hand it to a user at node B 12. The key is then entered by each user into his respective computer. Thus, when a connection is opened, both node A 11 and node B 12 know the shared key. A major drawback to this method is it is too unwieldy to be implemented for a large, multiuser network.

Referring now to FIG. 4, there is illustrated another method for negotiating a key where one node is identified as a central trusted node 30. Both node A 11 and node B 12 have a key which they use to securely transmit data packets to the central trusted node 30. Thus, all packets between node A 11 and node B 12 would be routed through the central trusted node 30. This is an inefficient but secure method of transmitting data between node A 11 and node B 12.

Another approach using the central trusted node 30 as a key distribution center is where when node A 11 wants to securely communicate with node B 12, node A 11 sends a message to the key distribution center 30. The key distribution center 30 generates and distributes a shared key to node A 11 and node B 12. Now both nodes have the shared key and can securely communicate directly with each other utilizing the shared key.

The use of a key distribution center 30 implies that the users in the network can trust the key distribution center 30 to not divulge the keys. Another method of negotiating a shared key is to utilize the key distribution center 30 to establish the initial contact between node A 11 and node B 12. Once secure communication is established, the two nodes are free to modify the shared key to establish a new shared key without any intervention by the key distribution center 30.

Each node also has a unique master key. In operation, after the shared key is successfully negotiated, the present invention provides for both node A 11 and node B 12 to separately encrypt this shared key under each node's unique master key utilizing an encryption algorithm. The encryption algorithm used could be the same one used to encrypt the data. This results in two distinct versions of the shared key, one at each node. The nodes 11 and 12 then exchange these encrypted versions of the shared key. Then each time a communication is initiated, for example, from node A 11 to node B 12, node A 11 will place in the key identifier field of the data packet 15 an encrypted version of the shared key.

In addition, according to one embodiment of the present invention, if confidentiality of the data is to be maintained, prior to actually transmitting the data packet 15, a node may encrypt the data under the control of the shared key and transmit the encrypted version of the shared key it received from the receiving node and data in a data packet to the receiving node.

To encrypt the data, there are a number of encryption algorithms which could be used. For illustration, the DES algorithm is explained below.

When a user wishes to send data over the network, the DES algorithm is applied to the data using the correct shared key. The output of the DES algorithm is placed in the data packet 15 in data 19.

The same algorithm can be used to encrypt and decrypt the encrypted version of the shared key. The same steps are followed but instead of having a data block, the data input is the shared key and the key which controls the encryption/decryption is the master key.

At this point, both node A 11 and node B 12 have negotiated a shared key, have encrypted the shared key under their respective master keys, and have exchanged the encrypted keys. When a user at node A 11 wishes to communicate with a user at node B 12, the adaptor 10 of node A 11 builds the data packet 15 with the proper header information, inserting node B 12's version of the shared key (i.e., the shared key encrypted under node B's 12 master key) in the cryptographic header 18, and encrypts the data under the control of the shared key. This data packet 15 is then transmitted to the adaptor 14 of node B 12 where it is received in serial fashion. The adaptor 14 of node B 12 decrypts the key identifier containing its encrypted version of the shared key under the control of its master key to obtain the shared key. This shared key is then used to decrypt the next block of the data packet, which is typically data, as it is received.

If the communication between node A 11 and node B 12 are not to be confidential, i.e., the data 19 in the data packet 15 is not encrypted, but integrity is to be provided, the DES algorithm and the shared key can be used to provide data integrity. When a user at node A 11 wishes to communicate with a user at node B 12, the adaptor 10 of node A 11 builds the data packet 15 with the proper header information, inserting node B's 12 encrypted version of the shared key in the cryptographic header 18. The data is placed in the data packet unencrypted. The DES algorithm performs a Cipher Block Chaining ("CBC") mode encryption calculation on the data as described below. The last eight bytes of the output of this algorithm are placed in ICV 20 of the data packet 15. This data packet is then transmitted to the adaptor 14 of node B 12 where it is received in serial fashion. The adaptor 14 of node B 12 decrypts the key identifier containing the encrypted version of the shared key under the control of its master key to obtain the shared key. This shared key is used to apply the CBC mode of DES on the data 19. The last eight bytes of the output of this calculation are compared with the ICV 20 of the received data packet 15 to determine if correct data has been received.

After the entire data packet is decrypted and/or its integrity has been checked, the data packet is placed in node B 12's memory where the node B 12 can perform a series of checks to determine which node in the network has sent the data packet and whether the proper shared key was used. These series of checks are performed by a look up operation in a look up table maintained in node memory. As stated above, these look up operations are performed after the cryptographic processing of the data packet. Thus, the present invention has moved the look up table from the adaptor 14 of node B 12 to node B 12's memory. Accordingly, the speed which the adaptor 14 performs the cryptographic processing is increased and more real estate is available on the adaptor 14 for other functions.

This is a description of the DES algorithm which was designed to encrypt and decrypt a block of eight bytes of data using an eight byte key. The decryption is done utilizing the same key as for encryption, but with an altered schedule of addressing the key bits so that the decryption process is the reverse of the encryption process. A data block to be encrypted is subjected to an initial permutation IP, then to a complex key-dependent computation and finally to a permutation which is the inverse of the initial permutation $IP^{-1}$. The key-dependent computation is defined in terms of an encryption function f, and a key schedule function KS.

Certain notations must be defined to illustrate the data encryption algorithm. Given two blocks L and R of bits, LR denotes the block consisting of the bits of L followed by the bits of R. The block of bits in LR are denoted as $B_1, B_2, \ldots B_8$, where the block consists of bits of $B_1$ followed by $B_2 \ldots$ followed by $B_8$.

The eight byte data block is first subjected to the initial permutation, IP which results in a permuted input where bit 58 is its first bit, bit 50 is the second bit, and so on with bit 7 as the last bit.

| IP | | | | | | | |
|---|---|---|---|---|---|---|---|
| 58 | 50 | 42 | 34 | 26 | 18 | 10 | 2 |
| 60 | 52 | 44 | 36 | 28 | 20 | 12 | 4 |
| 62 | 54 | 46 | 38 | 30 | 22 | 14 | 6 |
| 64 | 56 | 48 | 40 | 32 | 24 | 16 | 8 |
| 57 | 49 | 41 | 33 | 25 | 17 | 9 | 1 |
| 59 | 51 | 43 | 35 | 27 | 19 | 11 | 3 |
| 61 | 53 | 45 | 37 | 29 | 21 | 13 | 5 |
| 63 | 55 | 47 | 39 | 31 | 23 | 15 | 7 |

Figure 5:
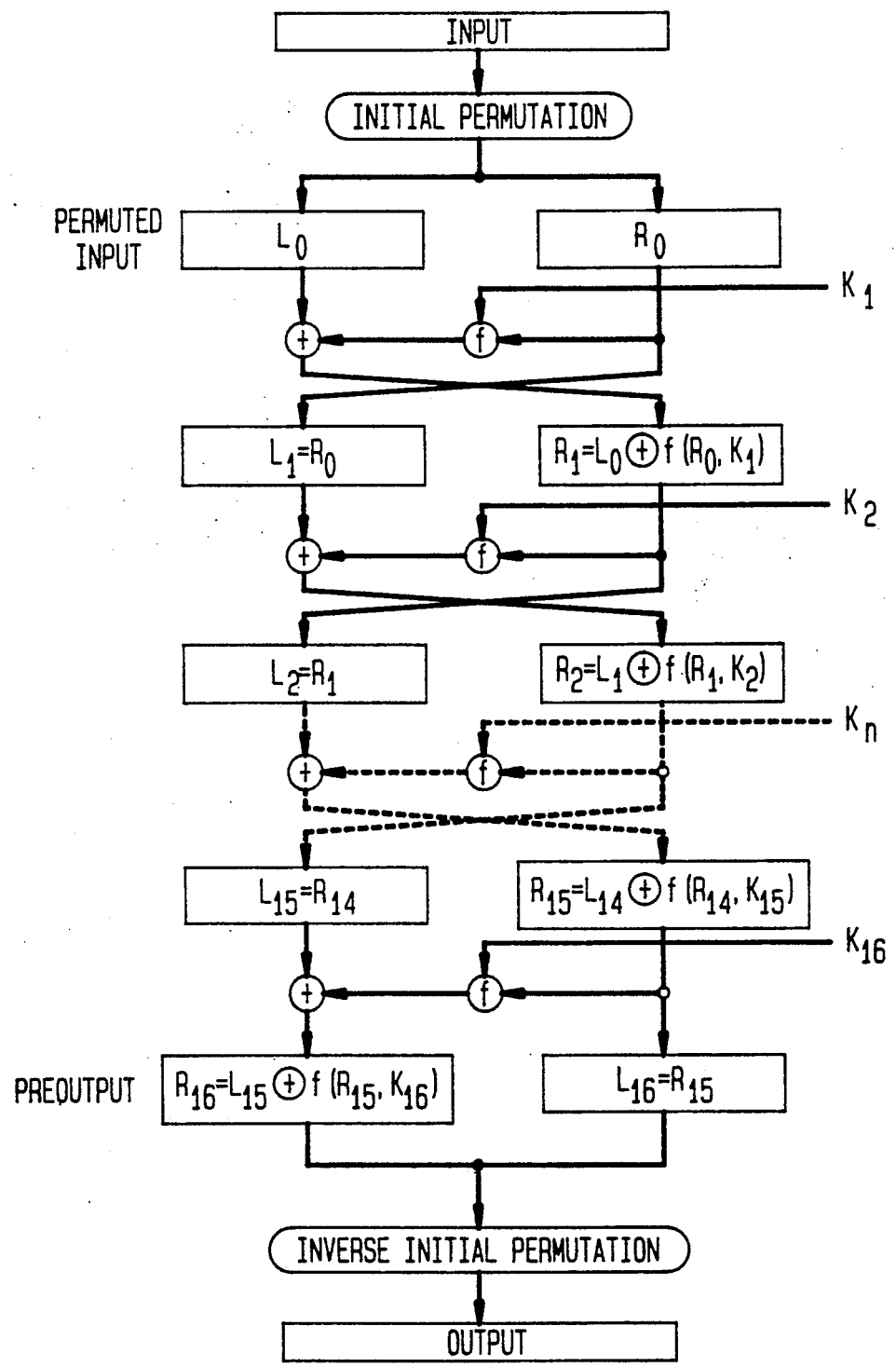
FIG. 5 is a flow diagram illustrating the Data Encryption Standard algorithm.

The permuted input block is then input to a complex key-dependent computation set forth in FIG. 5 which produces an output referred to as a preoutput. The preoutput is then subjected to the inverse permutation set forth below to produce the encrypted data. The decrypted data bit locations are defined in the same manner as the permuted input block.

| $IP^{-1}$ | | | | | | | |
|---|---|---|---|---|---|---|---|
| 40 | 8 | 48 | 16 | 56 | 24 | 64 | 32 |
| 39 | 7 | 47 | 15 | 55 | 23 | 63 | 31 |
| 38 | 6 | 46 | 14 | 54 | 22 | 62 | 30 |
| 37 | 5 | 45 | 13 | 53 | 21 | 61 | 29 |
| 36 | 4 | 44 | 12 | 52 | 20 | 60 | 28 |
| 35 | 3 | 43 | 11 | 51 | 19 | 59 | 27 |
| 34 | 2 | 42 | 10 | 50 | 18 | 58 | 26 |
| 33 | 1 | 41 | 9 | 49 | 17 | 57 | 25 |

The computation which uses the permuted input block as its input to produce the preoutput block consists primarily of 16 iterations of a calculation described below. The calculation is described in terms of the encryption function f, which operates on a data block of 32 bits and a data block of 48 bits, and produces a block of 32 bits.

Let the 64 bits of the input block to an iteration consist of a 32 bit block L followed by a 32 bit block R. Using the notations defined above, the input block is then LR. K is defined to be a block of 48 bits chosen from the 64 bit key. The output L'R' of an iteration with input LR is set forth below where + denotes bit-by-bit modulo 2 addition.

$$L' = R \qquad (1)$$

$$R' = L + f(R_1 K)$$

The input to the first iteration of the calculation is the permuted input block as set forth in FIG. 5. Since L'R' is the output of the sixteenth iteration, the R'L' is the preoutput block. As shown in FIG. 5, a different block of key bits K from the 64 bit key is utilized at each iteration in the calculation.

The key schedule, KS, is defined as a function which takes an integer n in the range from one to sixteen and eight byte block key as an input and yields a 48 bit block $K_n$ output. This output is a permuted selection of bits from the key defined as follows with $K_n$ determined by the bits in 48 distinct bit positions of KEY.

$$K_n = KS(n, KEY) \qquad (2)$$

KS is called the key schedule because the block K used in the nth iteration of equation one is the block $K_n$ set forth above.

Finally, $L_o$ and $R_o$ are chosen to be L and R, and $L_n$ and $R_n$ are chosen to be L' and R' of equation one when L and R are $L_{n-1}$ and $R_{n-1}$ and K is $K_n$. When these variables are defined in this manner and n is in the range from one to sixteen, then the conditions set forth below exist.

$$L_n = R_{n-1} \qquad (3)$$

$$R_n = L_{n-1} + f(R_{n-1}, K_n)$$

The preoutput block is then defined by $R_{16}L_{16}$.

To decrypt the encrypted output of the above calculation, it is necessary to apply the same algorithm to the encrypted data block insuring that the same block of key bits K is used during decryption at each iteration of the computation as was used during data encryption. This can be expressed by the following equation where $R_{16}L_{16}$ is now the permuted input block and $L_oR_o$ is the preoutput block.

$$R_{n-1} = L_n \qquad (4)$$

$$L_{n-1} = R_n + F(L_n, K_n)$$

For a more detailed explanation of the above algorithm as well as various possible modes of operation utilizing the algorithm, reference should be made to National Bureau of Standards publications FIPS PUB 46 entitled "Specification for the Data Encryption Standard" and particularly, Appendix D of FIPS PUB 112 entitled "Password Usage" which sets forth a FORTRAN program implementing the DES algorithm for password encryption.

The previous description demonstrates a method for encrypting and decrypting one eight byte block using the DES algorithm. To encrypt/decrypt larger groups of data it is necessary to using a chaining mode of DES such as Cipher Block Chaining ("CBC"). Using this mode, it is possible to encrypt/decrypt arbitrarily long groups of data. For a more detailed explanation of CBC, reference should be made to National Bureau of Standard publication FIPS PUB 81 entitled "DES Modes of Operation".

The above described exemplary embodiment of the invention is meant to be representative only, as certain changes may be made therein without departing from the clear teachings of the invention. Accordingly, reference should be made to the following claims which alone define the invention.

What is claimed is:

1. A method for establishing secure communications between a first node and a second node in a network, comprising the steps of:

(a) coupling the first node to the second node, the second node having a master key that is unique to that node and known only by the second node, both nodes having a shared key;

(b) encrypting the shared key at the second node under the control of the master key of the second node to form an encrypted version of the shared key; and (c) transmitting the encrypted version of the shared key from the second node to the first node so that the encrypted version of the shared key can be incorporated by the first node into encrypted data packets transmitted to the second node and used by the second node to decrypt data in transmitted encrypted data packets to establish secure communications between the first node and the second node.

2. A method for building a data packet in a network, comprising the steps of:

(a) coupling a first node to a second node, the second node having a master key that is unique to that node and known only by the second node, both nodes having a shared key, the first node including a memory;

(b) transmitting from the second node to the first node an encrypted version of the shared key encrypted under the control of the master key of the second node;

(c) creating a data packet in the memory of the first node by:

(i) placing header information in the data packet,
        (ii) placing the encrypted version of the shared key received from the second node in the data packet, and
        (iii) placing encrypted data in the data packet.

3. A method for establishing secure communications between a first node and a second node in a network, comprising the steps of:

(a) coupling the first node to the second node, the second node having a master key that is unique to that node and known only by the second node, both nodes having a shared key;

(b) transmitting from the second node to the first node an encrypted version of the shared key encrypted under the control of the master key of the second node so that the encrypted version of the shared key can be incorporated by the first node into encrypted data packets transmitted to the second node and used by the second node to decrypt data in transmitted encrypted data packets to establish secure communications between the first node and the second node; and (c) transmitting from the first node to the second node an encrypted data packet including the encrypted version of the shared key and data encrypted under the shared key.

4. A method for establishing secure communications between a first node and a second node in a network, comprising the steps of:

(a) coupling the first node to the second node, the second node having a master key that is unique to that node and known only by the second node, both nodes having a shared key;

(b) transmitting from the second node to the first node an encrypted version of the shared key encrypted under the control of the master key of the second node so that the encrypted version of the shared key can be incorporated by the first node into encrypted data packets transmitted to the second node and used by the second node to decrypt data in transmitted encrypted data packets to establish secure communications between the first node and the second node;

(c) building an encrypted data packet in the first node incorporating the encrypted version of the shared key and data encrypted under the shared key; and (d) transmitting from the first node to the second node the encrypted data packet including the encrypted version of the shared key encrypted under the control of the master key of the second node and data encrypted under the shared key.

5. A method for transmitting and decrypting a data packet in a network, comprising the steps of:

(a) coupling a first node to a second node, the second node having a master key that is unique to that node and known only by the second node, both nodes having a shared key;

(b) transmitting from the second node to the first node an encrypted version of the shared key encrypted under the control of the master key of the second node;

(c) transmitting from the first node to the second node an encrypted data packet including the encrypted version of the shared key and data encrypted under the shared key;

(d) decrypting the encrypted version of the shared key at the second node under the control of the master key of the second node to obtain the shared key; and (e) decrypting the data at the second node under the control of the shared key.

6. A method for secure transmission of a data packet in a network comprising the steps of:

(a) coupling a first node to a second node, the second node having a master key that is unique to that node and known only by the second node, both nodes having a shared key;

(b) encrypting the shared key at the second node under the control of the master key of the second node to form an encrypted version of the shared key;

(c) transmitting the encrypted version of the shared key from the second node to the first node;

(d) encrypting data under the control of the shared key at the first node;

(e) building an encrypted data packet incorporating the encrypted version of the shared key received from the second node and data encrypted under the control of the shared key;

(f) transmitting the encrypted data packet from the first node to the second node;

(g) decrypting the encrypted version of the shared key at the second node under the control of the second node's master key to obtain the shared key; and (h) decrypting the data at the second node under the control of the shared key.

7. The method of any one of claims 3, 4, 5 and 6 wherein the step of transmitting the encrypted data packet is done serially.

8. The method of any one of claims 3, 4, 5 and 6 wherein the first node has a master key to provide for two-way encrypted communications.

9. A network comprising:

at least a first and a second node, each node having a master key known only to that node, both nodes having a shared key, the nodes being coupled to form a network;

the second node adapted to transmit to the first node an encrypted version of the shared key encrypted under the control of the master key of the second node;

the first node adapted to transmit an encrypted data packet including the encrypted version of the shared key and encrypted data encrypted under the control of the shared key;

a decrypter coupled to the second node, comprising:
  an input device adapted to receive the encrypted data packet;
  a storage device coupled to the input device adapted to store the master key of the second node;
  a decryption device coupled to the input device and the storage device, adapted to decrypt the encrypted version of the shared key under the control of the master key and decrypt the encrypted data under the control of the shared key.

10. A network comprising:

at least a first and a second node, each node having a master key known only to that node, both nodes having a shared key, the nodes being coupled to form a network;

an encrypter coupled to the first node comprising:
  an input device adapted to receive from the second node an encrypted version of the shared key encrypted under the control of a master key known only by the second node;
  a storage device coupled to the input device, the storage device adapted to store the shared key and the encrypted version of the shared key;
  a device coupled to the storage device adapted to encrypt data under the control of the shared key;
  a packet builder coupled to the storage device and the device, adapted to build a data packet incorporating the encrypted version of the shared key and the encrypted data.

11. The encrypter of claim 10, further comprising an output device coupled to the packet builder to transmit the encrypted data packet.

12. A network comprising:

at least a first and a second node, each node having a master key known only to that node, both nodes having a shared key, the nodes being coupled to form a network;

the second node adapted to transmit to the first node an encrypted version of the shared key encrypted under the control of the master key of the second node;

a decrypter coupled to the second node;

an encrypted data packet at the first node, the encrypted data packet having an encrypted version of the shared key and encrypted data encrypted under the control of the shared key;

the first node adapted to transmit the encrypted data packet to the second node;

the decrypter adapted to receive the encrypted data packet transmitted from the first node;

the decrypter adapted to decrypt the encrypted version of the shared key under the control of the master key of the second node and decrypt the encrypted data under the control of the shared key.

13. A network comprising:

at least a first and second node, each node having a master key known only to that node, both nodes having a shared key, the nodes being coupled to form the network;

the second node adapted to transmit to the first node an encrypted version of the shared key encrypted under the control of the master key of the second node;

a storage device at the first node adapted to store the shared key and an encrypted version of the shared key encrypted under the control of the master key of the second node;

a device coupled to the storage device adapted to encrypt data under the control of the shared key;

a packet builder coupled to the storage device and the device, adapted to build a data packet incorporating the encrypted version of the shared key and the encrypted data;

the first node adapted to transmit the data packet to the second node;

an input device at the second node adapted to receive the encrypted data packet including the encrypted version of the shared key encrypted under the control of the master key of the second node and the encrypted data encrypted under the control of the shared key;

a storage device coupled to the input device adapted to store the master key of the second node; and a decryption device coupled to the input device and the storage device, adapted to decrypt the encrypted version of the shared key under the control of the master key at the second node and decrypt the encrypted data under the control of the shared key.

14. A method for building a data packet in a network, comprising the steps of:
 (a) coupling a first node to a second node, the second node having a master key that is unique to that node and both nodes having a shared key, the first node including a memory;
 (b) transmitting from the second node to the first node an encrypted version of the shared key encrypted under the control of the master key of the second node; and
 (c) creating a data packet in the memory of the first node by:
  (i) placing header information in the data packet,
  (ii) placing the encrypted version of the shared key received from the second node in the data packet,
  (iii) placing encrypted data in the data packet, and
  (iv) placing an integrity check vector in the data packet.

15. A method for establishing secure communications between a first node and a second node in a network, comprising the steps of:
 (a) coupling the first node to the second node, the second node having a master key that is unique to that node and both nodes having a shared key;
 (b) transmitting from the second node to the first node an encrypted version of the shared key encrypted under the control of the master key of the second node so that the encrypted version of the shared key can be incorporated by the first node into data packets transmitted to the second node and used by the second node to decrypt data in transmitted data packets to establish secure communications between the first node and the second node; and
 (c) transmitting from the first node to the second node a data packet including an encrypted version of the shared key encrypted under the control of the master key of the second node, data and an integrity check vector incorporated in the data packet as a function of the shared key and the data.

16. A method for establishing secure communications between a first node and a second node in a network, comprising the steps of:
 (a) coupling the first node to the second node, the second node having a master key that is unique to that node and both nodes having a shared key;
 (b) transmitting from the second node to the first node an encrypted version of the shared key encrypted under the control of the master key of the second node so that the encrypted version of the shared key can be incorporated by the first node into encrypted data packets transmitted to the second node and used by the second node to decrypt data in transmitted encrypted data packets to establish secure communications between the first node and the second node;
 (c) building a data packet at the first node, the data packet comprising an encrypted version of the shared key encrypted under the master key of the second node, data and an integrity check vector incorporated in the data packet as a function of the shared key and the data; and
 (d) transmitting from the first node to the second node and encrypted version of the data packet including the encrypted version of the shared key encrypted under the control of the master key of the second node, data and an integrity check vector incorporated in the data packet as a function of the shared key and the data.

17. A method for transmitting and verifying the integrity of a data packet in a network, comprising the steps of:
 (a) coupling a first node to a second node, the second node having a master key that is unique to that node and both nodes having a shared key;
 (b) transmitting from the first node to the second node a data packet including an encrypted version of the shared key encrypted under the control of the master key of the second node, data and a first integrity check vector incorporated in the data packet as a function of the shared key and the data;
 (c) decrypting an encrypted version of the shared key as it is received by the second node under the control of the master key of the second node to obtain the shared key;
 (d) calculating at the second node a second integrity check vector utilizing the data of the data packet as received and the shared key at the second node; and
 (e) comparing the second integrity check vector to the first integrity check vector received by the second node in the data packet.

18. The method of any one of claims 15, 16 and 17 wherein the step of transmitting the data packet is done serially.

19. The method of any one of claims 15, 16 and 17 wherein the first node has a master key to provide for two-way communications.

20. A method for high integrity transmission of a data packet in a network comprising the steps of:

(a) coupling a first node to a second node, the second node having a master key that is unique to that node and both nodes having a shared key;

(b) encrypting the shared key at the second node under the control of the master key of the second node to form an encrypted version of the shared key;

(c) transmitting the encrypted version of the shared key from the second node to the first node;

(d) building a data packet at the first node, the data packet comprising an encrypted version of the shared key encrypted under the master key of the second node, data and a first integrity check vector incorporated in the data packet as a function of the shared key and the data;

(e) transmitting the data packet from the first node to the second node;

(f) decrypting the encrypted version of the shared key as it is received at the second node under the control of the second node's master key to obtain the shared key;

(g) calculating at the second node a second integrity check vector utilizing the data of the data packet as it is received at the second node and the shared key of the data packet; and (h) comparing the second integrity check vector to the first integrity check vector received by the second node in the data packet.

21. A network comprising:

at least a first and a second node, each node having a master key and both nodes having a shared key, the nodes being coupled to form a network;

a decrypter coupled to the second node;

a data packet at the first node, the data packet having data, an encrypted version of the shared key encrypted under the master key of the second node and an integrity check vector;

the first node adapted to transmit the data packet to the second node;

the decrypter adapted to receive the data packet transmitted from the first node;

the decrypter adapted to decrypt the encrypted version of the shared key under the control of the master key of the second node;

an integrity checking device coupled to the decrypter adapted to calculate an integrity check vector utilizing the data as received at the second node and the shared key and compare the calculated integrity check vector to the integrity check vector in the data packet.

22. A network comprising:

at least a first and second node, each node having a master key and both nodes having a shared key, the nodes being coupled to form the network;

a first storage device at the first node adapted to store an encrypted version of at least one shared key encrypted under the control of the master key of the second node;

an integrity check vector calculating device coupled to the first storage device adapted to calculate an integrity check vector utilizing data and the at least one shared key; and a packet builder at the first node coupled to the first storage device and the integrity check vector calculating device, adapted to build a data packet incorporating the encrypted version of the at least one shared key, data and the integrity check vector;

the first node adapted to transmit the data packet to the second node;

an input device at the second node adapted to receive the data packet;

a second storage device at the second node coupled to the input device, adapted to store the master key;

a decryption device coupled to the input device and the second storage device, adapted to decrypt the encrypted version of the at least one shared key under the control of the master key;

an integrity checking device coupled to the input device and the decryption device, adapted to calculate an integrity check vector utilizing the data as received at the second node and the at least one shared key and compare the calculated integrity check vector to the integrity check vector in the data packet.

* * * * *